US009049059B2

(12) United States Patent
Nakao et al.

(10) Patent No.: US 9,049,059 B2
(45) Date of Patent: Jun. 2, 2015

(54) RECEIVING CIRCUIT

(71) Applicant: FUJITSU LIMITED, Kawasaki-shi, Kanagawa (JP)

(72) Inventors: Takanori Nakao, Kawasaki (JP); Yoichi Koyanagi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/249,977

(22) Filed: Apr. 10, 2014

(65) Prior Publication Data
US 2014/0362899 A1 Dec. 11, 2014

(30) Foreign Application Priority Data

Jun. 5, 2013 (JP) ................................ 2013-118889

(51) Int. Cl.
H03K 9/00 (2006.01)
H04L 27/01 (2006.01)
H04B 1/16 (2006.01)
(52) U.S. Cl.
CPC . *H04L 27/01* (2013.01); *H04B 1/16* (2013.01)
(58) Field of Classification Search
USPC .......................... 375/146, 147, 150; 370/335
See application file for complete search history.

(56) References Cited

U.S. PATENT DOCUMENTS

| | | | |
|---|---|---|---|
| 2009/0029670 A1* | 1/2009 | Cho et al. | 455/344 |
| 2010/0284444 A1* | 11/2010 | Lakkis | 375/150 |
| 2011/0002374 A1 | 1/2011 | Kibune et al. | |
| 2011/0063519 A1* | 3/2011 | Hasegawa | 348/726 |
| 2014/0348135 A1* | 11/2014 | Ozluturk et al. | 370/335 |
| 2014/0348212 A1* | 11/2014 | Lakkis | 375/146 |

FOREIGN PATENT DOCUMENTS

| | | |
|---|---|---|
| JP | 2011-015184 A | 1/2011 |
| JP | 2011-244284 A | 12/2011 |

OTHER PUBLICATIONS

Stauffer, et al., "High Speed Serdes Devices and Applications," Springer Science+Business Media, LLC, 2008, pp. 1-484, New York, NY.

* cited by examiner

*Primary Examiner* — Eva Puente
(74) *Attorney, Agent, or Firm* — Arent Fox LLP

(57) ABSTRACT

A circuit includes: a first adder configured to add a first offset cancellation value to an input signal value; a second adder configured to add a first equalization value to an output signal value from the first adder; a first comparator configured to make a binary decision on an output signal value from the second adder; a third adder configured to add a second offset cancellation value to the input signal value; a fourth adder configured to add a second equalization value to an output signal value from the third adder; a second comparator configured to make a binary decision on an output signal value from the fourth adder; a selector configured to output a determination result of the first comparator or a determination result of the second comparator in accordance with a determination result of preceding one bit of the input signal value.

7 Claims, 8 Drawing Sheets

RECEIVING CIRCUIT

CROSS-REFERENCE TO RELATED APPLICATION

This application is based upon and claims the benefit of priority of the prior Japanese Patent Application No. 2013-118889, filed on Jun. 5, 2013, the entire contents of which are incorporated herein by reference.

FIELD

The embodiments discussed herein are related to a receiving circuit.

BACKGROUND

For example, Japanese Laid-open Patent Publication No. 2011-244284 discusses an equalizer including a first waveform equalization processing unit and a second waveform equalization processing unit that alternately equalize the waveforms of a plurality of continuous input signals. The first waveform equalization processing unit and the second waveform equalization processing unit perform waveform equalization processing by adding, to input signals to be subjected to waveform equalization processing, a value obtained by multiplying a value indicating the decision result of the second input signal before the target signal and a value obtained by multiplying a value indicating the determination result of the fourth input signal before the target signal by a constant, respectively.

For example, Japanese Laid-open Patent Publication No. 2011-015184 discusses a receiving circuit including an equalization processing section that performs equalization processing on a first signal waveform to obtain a second signal waveform and that can adjust the characteristics of the equalization processing in accordance with the error between the second signal waveform and the third signal waveform. An offset adjusting section receives a signal indicating the error from the equalization processing section and adjusts the offset of the first signal waveform before being subjected to equalization processing in response to the signal indicating the error.

Receiving circuits preferably include an equalizing section that performs the equalization processing and an offset adjusting section that adjusts the offset. Here, the receiving circuits preferably include a high-speed equalizing section to support high-speed communications. However, even if a high-speed equalizing section can be achieved, connecting an offset adjusting section to the equalizing section will disadvantageously decrease the operation speed of the equalizing section.

SUMMARY

According to an aspect of the embodiments, a receiving circuit includes a first adder configured to add a first offset cancellation value to an input signal value; a second adder configured to add a first equalization value to an output signal value from the first adder; a first comparator configured to make a binary decision on an output signal value from the second adder; a third adder configured to add a second offset cancellation value to the input signal value; a fourth adder configured to add a second equalization value to an output signal value from the third adder; a second comparator configured to make a binary decision on an output signal value from the fourth adder; a selector configured to output a determination result of the first comparator or a determination result of the second comparator in accordance with a determination result of preceding one bit of the input signal value; a demultiplexer configured to convert an output signal from the selector from serial to parallel; and an offset cancellation circuit connected to a subsequent stage of the demultiplexer and configured to control the first offset cancellation value and the second offset cancellation value in accordance with the determination result of the preceding one bit of the input signal value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
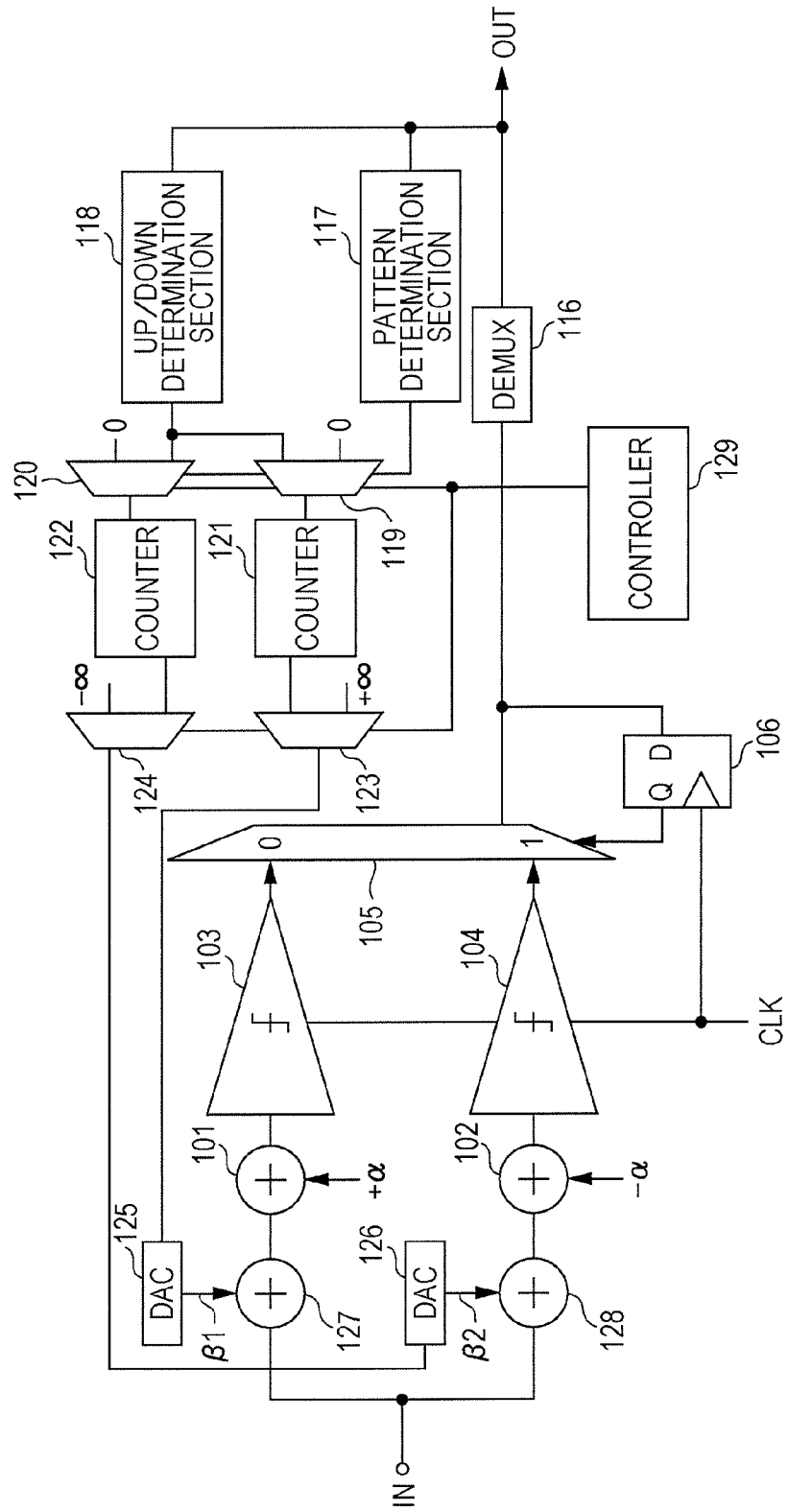
FIG. 1 is a diagram illustrating an example configuration of a receiving circuit according to an embodiment.

FIG. 1 is a diagram illustrating an example configuration of a receiving circuit according to an embodiment. The receiving circuit includes an equalization circuit and an offset cancellation circuit. The equalization circuit is a speculative decision-feedback equalization circuit including second and fourth adders 101 and 102, first and second comparators 103 and 104, a selector 105, a D flip-flop 106, and a demultiplexer 116. The offset cancellation circuit includes a pattern determination section 117, an up/down determination section 118, selectors 119, 120, 123, and 124, counters 121 and 122, digital-to-analog converters 125 and 126, and first and third adders 127 and 128. The receiving circuit performs equalization processing on an input signal IN with the equalization circuit, cancels the offset of the equalization circuit with the offset cancellation circuit, and outputs an output signal OUT.

Figure 2:
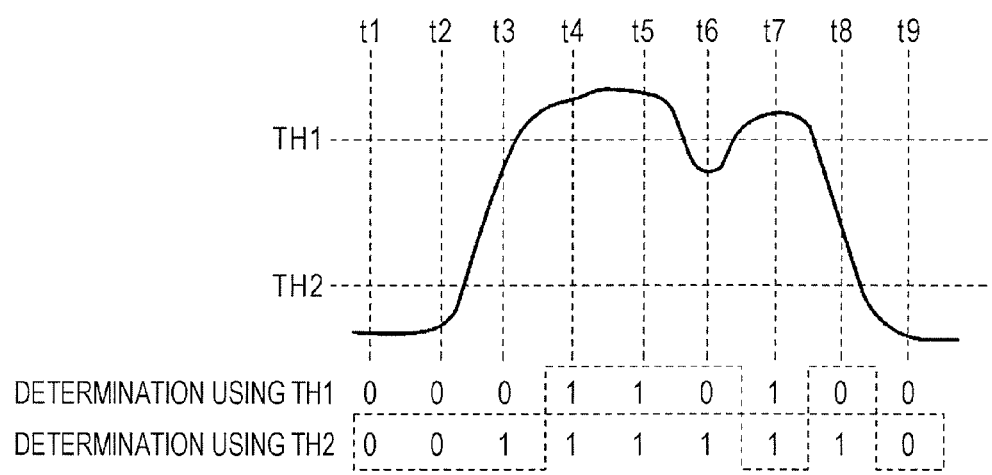
FIG. 2 is a diagram illustrating the voltage waveform of an input signal.

FIG. 2 is a diagram illustrating the voltage waveform of the input signal IN. The operation of the equalization circuit will be described hereinbelow with reference to FIG. 2. A transmission circuit transmits a binary signal at high level (for example, +5 mV) and at low level (for example, −5 mV) to the receiving circuit. The receiving circuit receives the input signal IN from the transmission circuit via a communication channel. The voltage waveform of the input signal IN becomes rounded due to the characteristics of the communication channel, as illustrated in FIG. 2.

The value of the transmission signal corresponding to the input signal IN is "0" at time t1, "0" at time t2, "1" at time t3, "1" at time t4, "1" at time t5, "0" at time t6, "1" at time t7, "0" at time t8, and "0" at time t9, as indicated by the broken line in FIG. 2. The input signal IN is a serial signal in which 1-bit signals lie in time sequence.

The input signal IN at time t3 is smaller than a first threshold value TH1 because the value at preceding time t2 is "0". In this case, if the equalization circuit determines that the input signal IN is "0", the determination is in error since the input signal IN is smaller than the first threshold value TH1. In contrast, if the equalization circuit determines that the input signal IN is "1", the determination is correct since the input signal IN is larger than the second threshold value TH2. Accordingly, it is preferable that the equalization circuit make a determination by using the second threshold value TH2 at time t3 since the value at the preceding time t2 is "0".

The input signal IN at time t6 is larger than the second threshold value TH2 since the value at the preceding time t5 is "1". In this case, if the equalization circuit determines that the input signal IN is "1", the determination is in error since the input signal IN is larger than the second threshold value TH2. In contrast, if the equalization circuit determines that the input signal IN is "0", the determination is correct since the input signal IN is smaller than the first threshold value TH1. Accordingly, it is preferable that the equalization circuit make a determination by using the first threshold value TH1 at time t6 since the value at the preceding time t5 is "1".

The input signal IN at time t8 is larger than the second threshold value TH2 since the value at the preceding time t7 is "1". In this case, if the equalization circuit determines that the input signal IN is "1", the determination is in error since the input signal IN is larger than the second threshold value TH2. In contrast, if the equalization circuit determines that the input signal IN is "0", the determination is correct since the input signal IN is smaller than the first threshold value TH1. Accordingly, it is preferable that the equalization circuit make a determination by using the first threshold value TH1 at time t8 since the value at the preceding time t7 is "1".

As described above, when the value at the preceding time is "0", the input signal IN becomes smaller at the present time. Thus, it is preferable that the equalization circuit make a determination on the value at the present time using the second threshold value TH2. For example, at time t1, t2, t3, t7, and t9, preferably, the equalization circuit may make a determination using the second threshold value TH2 since the values at the preceding times are "0", as indicated by the broken line in FIG. 2.

In contrast, when the value at the preceding time is "0", the input signal IN becomes smaller at the present time. Thus, it is preferable that the equalization circuit make a determination on the value at the present time using the first threshold value TH1. For example, at time t4, t5, t6, and t8, preferably, the equalization circuit may make a determination using the first threshold value TH1 since the values at the preceding times are "1", as indicated by the broken line in FIG. 2.

Next, the equalization circuit in FIG. 1 will be described. The input signal IN is an analog signal whose maximum value (high level) is +5 mV and minimum value (low level) is −5 mV, for example. The equalization circuit includes a first equalizing section and a second equalizing section. The first equalizing section includes the second adder 101 and the first comparator 103. The second equalizing section includes the fourth adder 102 and the second comparator 104.

The first adder 127 adds a first offset cancellation value β1 to the input signal IN and outputs it. If the offset of the first equalizing section is 0, the first offset cancellation value β1 is 0. The second adder 101 adds a first equalization value +α to the output signal from the first adder 127. For example, if the high level of the binary signal is +5 mV, the first equalization value +α is 0 to +5 mV. The first comparator 103 makes a binary decision on the output signal from the second adder 101 in synchronization with a clock signal CLK. Specifically, when the output signal from the second adder 101 is larger than a threshold value (0 V), the first comparator 103 outputs a value "1", and when the output signal from the second adder 101 is smaller than the threshold value (0 V), the first comparator 103 outputs a value "0". Since the first equalizing section includes the second adder 101 and the first comparator 103 and adds the first equalization value +α, the first equalizing section supports equalization processing for a binary decision using the second threshold value TH2 in FIG. 2.

The third adder 128 adds a second offset cancellation value β2 to the input signal IN and outputs it. If the offset of the second equalizing section is 0, the second offset cancellation value β2 is 0. The fourth adder 102 adds a second equalization value −α to the output signal from the third adder 128. For example, if the low level of the binary signal is −5 mV, the second equalization value −α is 0 to −5 mV. The second comparator 104 makes a binary decision on the output signal from the fourth adder 102 in synchronization with the clock signal CLK. Specifically, when the output signal from the fourth adder 102 is larger than the threshold value (0 V), the second comparator 104 outputs a value "1", and when the output signal from the fourth adder 102 is smaller than the threshold value (0 V), the second comparator 104 outputs a value "0". Since the second equalizing section includes the fourth adder 102 and the second comparator 104 and adds the second equalization value −α, the second equalizing section supports equalization processing for a binary decision using the first threshold value TH1 in FIG. 2.

When an output value from the D flip-flop 106 is 0, the selector 105 selects the output value of the determination result of the first comparator 103 and outputs it, and when the output value of the D flip-flop 106 is 1, the selector 105 selects the output value of the determination result of the second comparator 104. The D flip-flop 106 latches the output value of the selector 105 in synchronization with the clock signal CLK, holds the latched value, and outputs it to the selector 105. In other words, the D flip-flop 106 outputs the determination value of the input signal IN at the preceding time to the selector 105. When the output value of the selector 105 at the preceding time is 0, the selector 105 outputs the determination result of the first comparator 103 in correspondence with a determination using the second threshold value TH2 in FIG. 2. When the output value of the selector 105 at the preceding time is 1, the selector 105 outputs the determination result of the second comparator 104 in correspondence with a determination using the first threshold value TH1 in FIG. 2. Thus, the equalization circuit can make an appropriate binary decision in accordance with the preceding determination value as shown in FIG. 2. The demultiplexer 116 converts the output signal from the selector 105 from serial to parallel and outputs the parallel-bit output signal OUT. The output signal OUT is a digital signal subjected to a binary decision by the equalization circuit. The demultiplexer 116 converts a high-speed data-rate serial signal to a low-speed data-rate parallel signal. This allows a process downstream of the demultiplexer 116 can be performed at low speed.

The first equalizing section including the second adder 101 and the first comparator 103 determines the present determination value when the preceding determination value is 0 in advance before the preceding determination value is determined. Similarly, the second equalizing section including the fourth adder 102 and the second comparator 104 determines the present determination value when the preceding determination value is 1 in advance before the preceding determination value is determined. After the preceding determination value is determined, the selector 105 selects the determination value of the first comparator 103 or the second comparator 104 in accordance with the preceding determination value and outputs it. This allows the processing speed of the equalization circuit to be increased.

If the waveform of the input signal IN is equalized in accordance with the preceding determination value after the preceding determination value is determined, and then a binary decision is made, the processing speed is decreased. In contrast, the equalization circuit of the embodiment is configured such that the selector 105 makes a selection after the preceding determination value is determined, as described above, thus increasing the processing speed to achieve high-speed communications.

Next, the offset cancellation circuit will be described. The offset cancellation circuit includes the pattern determination section 117, the up/down determination section 118, the selectors 119, 120, 123, and 124, the counters 121 and 122, the digital-to-analog converters 125 and 126, and the first and third adders 127 and 128 and is connected to the subsequent stage of the demultiplexer 116.

First, the offset of the equalization circuit will be described. If, for example, +2 mV is input as the input signal IN, and when an offset of −2 mV is present in the adder 101 and/or 127, the first comparator 103 inputs a signal of 0 mV. The threshold value for the determination of the first comparator 103 can be shifted from 0 V due to offset. Such offsets are caused by variations in the manufacture of the adders 101 and 127, the comparator 103, and so on or changes in ambient temperature. Therefore, the offset of the first equalizing section including the adders 101 and 127 and the comparator 103 and the offset of the second equalizing section including the adders 102 and 128 and the comparator 104 are not necessarily the same.

For example, in FIG. 2, if the input signal IN at time t4 decreases to a value smaller than the first threshold value TH1 due to a negative offset, it is determined to be "0" in error. If the input signal IN at time t6 increases to a value larger than the first threshold value TH1 due to a positive offset, it is determined to be "1" in error. The offset cancellation circuit cancels such offsets. This allows the equalization circuit to make a proper binary decision.

The offset cancellation circuit sets the first offset cancellation value $\beta 1$ for canceling all the offsets from the input position of the input signal IN to the output position of the first comparator 103. The offset cancellation circuit also sets the second offset cancellation value $\beta 2$ for canceling all the offsets from the input position of the input signal IN to the output position of the second comparator 104.

The first adder 127 adds the first offset cancellation value $\beta 1$ to the input signal IN. This allows all the offsets from the input position of the input signal IN to the output position of the first comparator 103 to be canceled. Likewise, the second adder 128 adds the second offset cancellation value $\beta 2$ to the input signal IN. This allows all the offsets from the input position of the input signal IN to the output position of the second comparator 104 to be canceled.

The receiving circuit first operates in an offset-cancellation setting mode. Thus, the first offset cancellation value $\beta 1$ and the second offset cancellation value $\beta 2$ are set. Thereafter, the first offset cancellation value $\beta 1$ and the second offset cancellation value $\beta 2$ are fixed to the set values, and an operation in a normal mode is performed.

Figure 3:
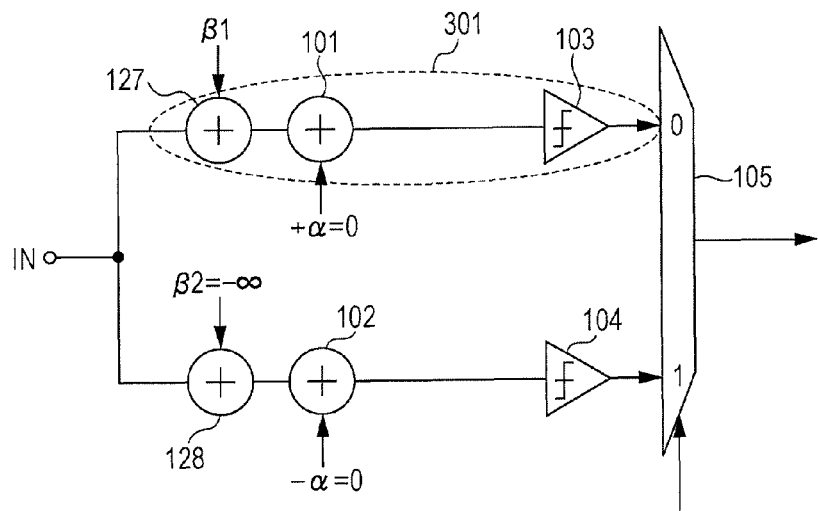
FIG. 3 is a diagram for explaining a method for setting a first offset cancellation value.

For example, when the power of the receiving circuit is turned on, the receiving circuit operates in the offset-cancellation setting mode. First, the first offset cancellation value $\beta 1$ is set. FIG. 3 is a diagram for explaining a method for setting the first offset cancellation value $\beta 1$. The first offset cancellation value $\beta 1$ is set to cancel the offset of a first channel 301 from the input position of the input signal IN to the output position of the first comparator 103. The input signal IN is set to a voltage of 0 V corresponding to the threshold value for the binary decision of the comparators 103 and 104. The first equalization value $+\alpha$ is set to 0, and the second equalization value $-\alpha$ is also set to 0. The second offset cancellation value $\beta 2$ is set to a minimum value ($-\infty$). The initial value of the first offset cancellation value $\beta 1$ is 0.

Since the input signal IN is at 0 V, the output value of the first comparator 103 is 1 if the offset of the first channel 301 is a positive value. In this case, it is preferable to decrease the first offset cancellation value $\beta 1$. In contrast, if the offset of the first channel 301 is a negative value, the output value of the first comparator 103 is 0. In this case, it is preferable to increase the first offset cancellation value $\beta 1$. By repeating this process, the first offset cancellation value $\beta 1$ converges to a correct value.

To set the offset cancellation value $\beta 1$ for the first channel 301, if the selector 105 selects the output value of the first comparator 103, the offset cancellation circuit controls the first offset cancellation value $\beta 1$, and if the selector 105 selects the output value of the second comparator 104, the offset cancellation circuit does not control the first offset cancellation value $\beta 1$. In other words, if the preceding determination value latched by the D flip-flop 106 is 0, the offset cancellation circuit controls the first offset cancellation value $\beta 1$, and if the preceding determination value latched by the D flip-flop 106 is 1, the offset cancellation circuit does not control the first offset cancellation value $\beta 1$.

Since the third adder 128 adds the second offset cancellation value $\beta 2$ of the minimum value ($-\infty$) to the input signal IN of 0 V, the output value of the second comparator 104 is 0. Accordingly, if the selector 105 selects the output value of the second comparator 104, the output value is 0. This causes the selector 105 to select the first comparator 103 next time. As a result, the selector 105 does not select the output value of the second comparator 104 two consecutive times. This increases the probability that the selector 105 selects the output value of the first comparator 103, thus allowing the first offset cancellation value $\beta 1$ to be set efficiently at high speed. By repeating the above process for a fixed time, the first offset cancellation value $\beta 1$ converges to a correct value.

Figure 4:
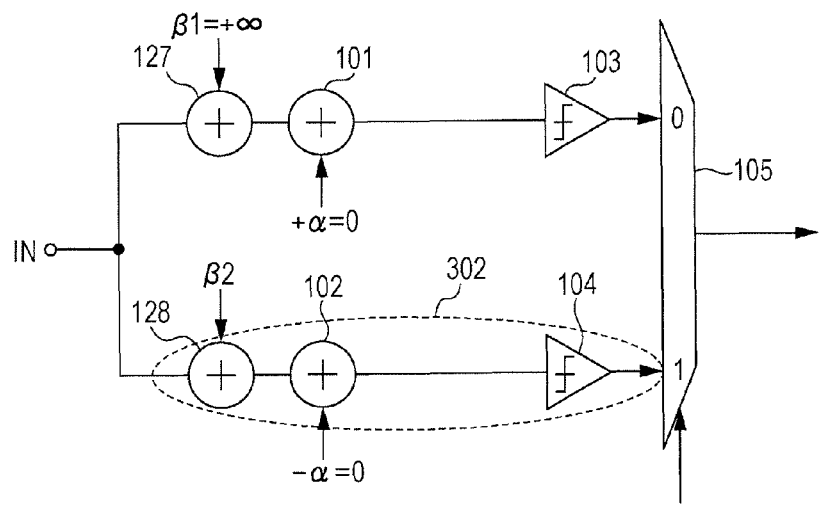
FIG. 4 is a diagram for explaining a method for setting a second offset cancellation value.

Next, the second offset cancellation value $\beta 2$ is set. FIG. 4 is a diagram for explaining a method for setting the second offset cancellation value $\beta 2$. The second offset cancellation value $\beta 2$ is set to cancel the offset of a second channel 302 from the input position of the input signal IN to the output position of the second comparator 104. As in the above, the input signal IN is set to a voltage of 0 V, which is the threshold value for the binary decision of the comparators 103 and 104. The first equalization value $+\alpha$ is set to 0, and the second equalization value $-\alpha$ is also set to 0. The first offset cancellation value $\beta 1$ is set to a maximum value ($+\infty$). The initial value of the second offset cancellation value $\beta 2$ is 0.

Since the input signal IN is at 0 V, the output value of the second comparator 104 is 1 if the offset of the second channel 302 is a positive value. In this case, it is preferable to decrease the second offset cancellation value $\beta 2$. In contrast, if the offset of the second channel 302 is a negative value, the output value of the second comparator 104 is 0. In this case, it is preferable to increase the second offset cancellation value β2. By repeating this process, the second offset cancellation value β2 converges to a correct value.

To set the offset cancellation value β2 for the second channel 302, if the selector 105 selects the output value of the second comparator 104, the offset cancellation circuit controls the second offset cancellation value β2, and if the selector 105 selects the output value of the first comparator 103, the offset cancellation circuit does not control the second offset cancellation value β2. In other words, if the preceding determination value latched by the D flip-flop 106 is 1, the offset cancellation circuit controls the second offset cancellation value β2, and if the preceding determination value latched by the D flip-flop 106 is 0, the offset cancellation circuit does not control the second offset cancellation value β2.

Since the first adder 127 adds the first offset cancellation value β1 of the maximum value (+∞) to the input signal IN of 0 V, the output value of the first comparator 103 is 1. Accordingly, if the selector 105 selects the output value of the first comparator 103, the output value is 1. This causes the selector 105 to select the second comparator 104 next time. As a result, the selector 105 does not select the output value of the first comparator 103 two consecutive times. This increases the probability that the selector 105 selects the output value of the second comparator 104, thus allowing the second offset cancellation value β2 to be set efficiently at high speed. By repeating the above process for a fixed time, the second offset cancellation value β2 converges to a correct value.

Next, the configuration of the offset cancellation circuit in FIG. 1 will be described. As described above, the input signal IN is at 0 V in the offset-cancellation setting mode. The first equalization value +α and the second equalization value −α are 0.

First, as shown in FIG. 3, the controller 129 outputs a control signal for setting the first offset cancellation value β1 for canceling the offset of the first channel 301 to the selectors 119, 120, 123, and 124 in the offset-cancellation setting mode. Based on the output signal OUT, if the present determination value is 0, the up/down determination section 118 outputs "+1" to increase the first offset cancellation value β1, and if the present determination value is 1, the up/down determination section 118 outputs "−1" to decrease the first offset cancellation value β1. If the preceding determination value is 0, the pattern determination section 117 outputs "0", and if the preceding determination value is 1, the pattern determination section 117 outputs "1". If the pattern determination section 117 outputs 0, the selector 119 selects the output value of the up/down determination section 118 and outputs it, and if the pattern determination section 117 outputs 1, the selector 119 selects "0" and outputs it. The selector 120 selects "0" and outputs it.

The counter 121 adds the output value of the selector 119 to the first offset cancellation value β1 whose initial value is 0 and outputs it. The counter 122 adds the output value of the selector 120 to the second offset cancellation value β2 whose initial value is 0 and outputs it. The selector 123 selects the output value of the counter 121 and outputs it. The selector 124 selects the minimum value (−∞) and outputs it. A digital-to-analog converter 125 converts the output value of the selector 123 from digital to analog and outputs the analog first offset cancellation value β1 to the first adder 127. A digital-to-analog converter 126 converts the output value of the selector 124 from digital to analog and outputs the analog second offset cancellation value β2 to the third adder 128. If the preceding determination value is 0, the first offset cancellation value β1 is increased or decreased depending on the output value of the up/down determination section 118, and if the preceding determination value is 1, the first offset cancellation value β1 is not changed. The second offset cancellation value β2 is set to the minimum value (−∞) as a second fixed value. By repeating the above process for a fixed time, the first offset cancellation value β1 converges to a correct value.

Next, as shown in FIG. 4, the controller 129 outputs a control signal for setting the second offset cancellation value β for canceling the offset of the second channel 302 to the selectors 119, 120, 123, and 124 in the offset-cancellation setting mode. Based on the output signal OUT, if the present determination value is 0, the up/down determination section 118 outputs "+1" to increase the second offset cancellation value β, and if the present determination value is 1, the up/down determination section 118 outputs "−1" to decrease the second offset cancellation value β. If the preceding determination value is 0, the pattern determination section 117 outputs "0", and if the preceding determination value is 1, the pattern determination section 117 outputs "1". If the pattern determination section 117 outputs 1, the selector 120 selects the output value of the up/down determination section 118 and outputs it, and if the pattern determination section 117 outputs 0, the selector 120 selects "0" and outputs it. The selector 119 selects "0" and outputs it.

The counter 122 adds the output value of the selector 120 to the second offset cancellation value β2 whose initial value is 0 and outputs it. The counter 121 adds the output value of the selector 119 to the first offset cancellation value β1. The selector 124 selects the output value of the counter 122 and outputs it. The selector 123 selects the maximum value (+∞) and outputs it. The digital-to-analog converter 126 converts the output value of the selector 124 from digital to analog and outputs the analog second offset cancellation value β2 to the third adder 128. The digital-to-analog converter 125 converts the output value of the selector 123 from digital to analog and outputs the analog first offset cancellation value β1 to the first adder 127. If the preceding determination value is 1, the second offset cancellation value β2 is increased or decreased depending on the output value of the up/down determination section 118, and if the preceding determination value is 0, the second offset cancellation value β2 is not changed. The first offset cancellation value β1 is set to the maximum value (−∞) as a first fixed value. By repeating the above process for a fixed time, the second offset cancellation value β2 converges to a correct value.

Thus, the process in the offset-cancellation setting mode is terminated, and the first offset cancellation value β1 and the second offset cancellation value β2 are fixed. Next, the receiving circuit performs a process in the normal mode. The input signal IN becomes the signal as in FIG. 2 through the receiving circuit. The first equalization value +α is set to a correct positive value, and the second equalization value −α is set to a correct negative value.

In the normal mode, the controller 129 outputs a control signal for equalization processing to the selectors 119, 120, 123, and 124. The selector 119 selects "0" and outputs it. The selector 120 selects "0" and outputs it. The counter 121 adds the output value of the selector 119 to the first offset cancellation value β1 and outputs it. The counter 122 adds the output value of the selector 120 to the second offset cancellation value β2 and outputs it. The selector 123 selects the output value of the counter 121 and outputs it. The selector 124 selects the output value of the counter 122 and outputs it. The digital-to-analog converter 125 converts the output value of the selector 123 from digital to analog and outputs the analog first offset cancellation value β1 to the first adder 127. The digital-to-analog converter 126 converts the output value of the selector 124 from digital to analog and outputs the analog second offset cancellation value β2 to the third adder 128. The first offset cancellation value β1 and the second offset cancellation value β2 are maintained unchanged.

The first adder 127 can cancel the offset of the first channel 301 by adding the first offset cancellation value β1 to the input signal IN. This allows the first comparator 103 to output a correct determination value. Likewise, the third adder 128 can cancel the offset of the second channel 302 by adding the second offset cancellation value β2 to the input signal IN. This allows the second comparator 104 to output a correct determination value.

Another conceivable method is connecting the offset cancellation circuit to the subsequent stage of the comparators 103 and 104 and setting the offset cancellation values β1 and β2 depending on the output values of the comparators 103 and 104. However, this method increases the output loads of the comparators 103 and 104, thus decreasing the processing speed of the equalization circuit. The embodiment can reduce a decrease in the processing speed of the equalization circuit by connecting the offset cancellation circuit to a low-speed processing section downstream from the demultiplexer 116.

Furthermore, if the offset cancellation circuit is connected to the subsequent stage of the demultiplexer 116, it is preferable to determine which of the first channel 301 and the second channel 302 the output value of the selector 105 has passed through. The embodiment can make the above determination with the pattern determination section 117, thus allowing the first offset cancellation value β1 to be controlled only when the output value has passed through the first channel 301 and the second offset cancellation value β2 to be controlled only when the output value has passed through the second channel 302.

For the setting of the first offset cancellation value β1, the second offset cancellation value β2 is set to the minimum value (−∞) to increase the probability that the output value passes through the first channel 301, as shown in FIG. 3. This allows the first offset cancellation value β1 to be set efficiently at high speed.

Likewise, for the setting of the second offset cancellation value β2, the first offset cancellation value β1 is set to the maximum value (+∞) to increase the probability that the output value passes through the second channel 302, as shown in FIG. 4. This allows the second offset cancellation value β2 to be set efficiently at high speed.

Furthermore, since the pattern determination section 117 and the up/down determination section 118 can be shaped by the two channels 301 and 302, the area efficiency can be increased.

As described above, the selector 105 outputs the determination result of the first comparator 103 or the determination result of the second comparator 104 depending on the determination result of the preceding one bit of the input signal IN. The components 117 to 126 of the offset cancellation circuit are connected to the subsequent stage of the demultiplexer 116 and control the first offset cancellation value β1 and the second offset cancellation value β2 depending on the determination result of the preceding one bit of the input signal IN. This allows the offset to be canceled while maintaining the high-speed operation of the equalization processing.

Figure 5:
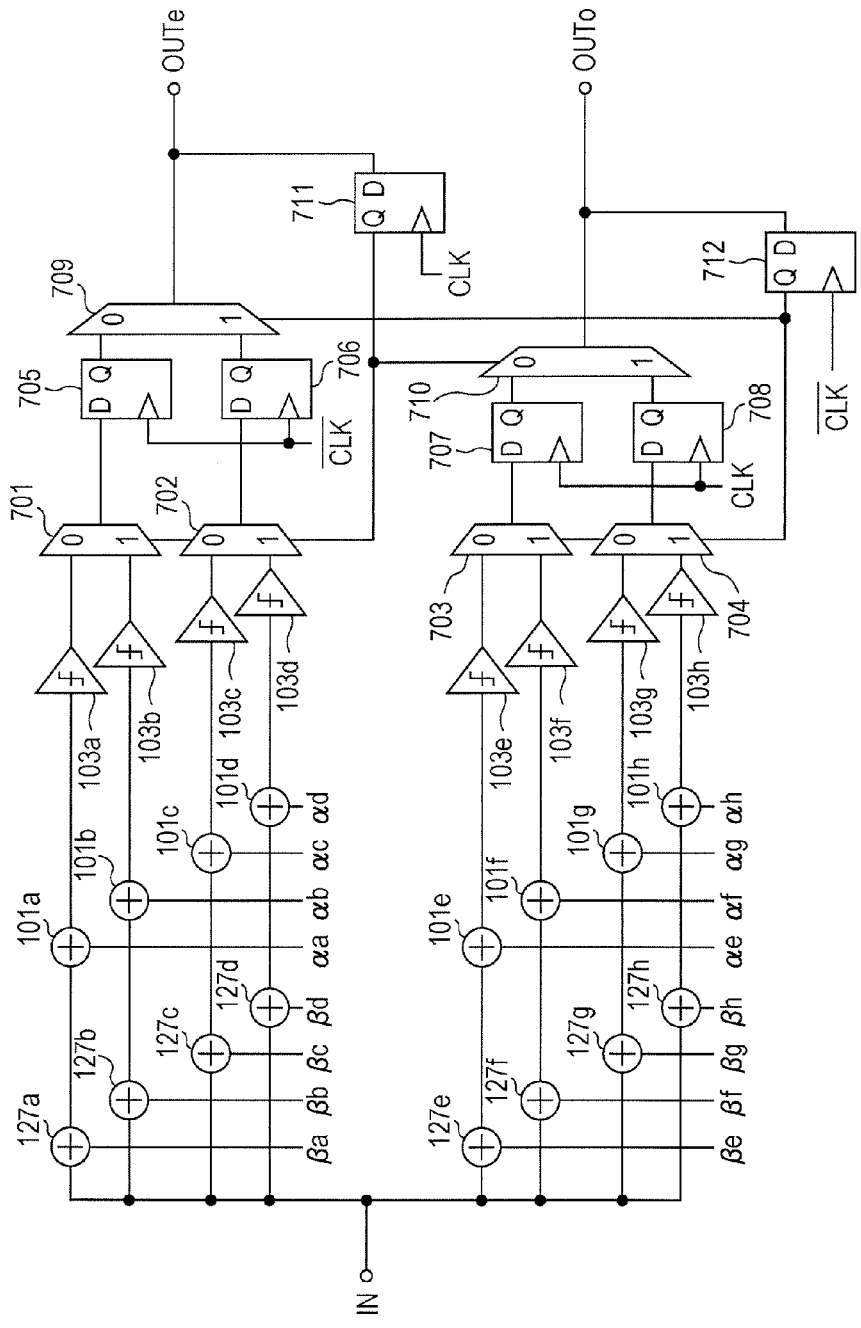
FIG. 5 is a diagram illustrating an example partial configuration of a receiving circuit according to another embodiment.

FIG. 5 is a diagram illustrating an example partial configuration of a receiving circuit according to another embodiment. FIG. 5 illustrates only the configuration of an equalization circuit. An offset cancellation circuit is the same as that in the another embodiment. The another embodiment has been described using an example in which the equalization circuit includes two channels 301 and 302 and performs equalization processing in accordance with the determination result of the preceding one bit of the input signal IN. The another embodiment will be described using an example in which the equalization circuit includes eight channels and performs equalization processing in accordance with the determination results of the preceding two bits of the input signal IN. The another embodiment includes an interleave two-tap speculative decision-feedback equalization circuit, which receives an input signal IN and an even-number-bit determination output signal OUTe and an odd-number-bit determination output signal OUTo.

First to fifteenth adders 127a to 127h correspond to the first adder 127 in FIG. 1. Second to sixteenth adders 101a to 101h correspond to the first adder 101 in FIG. 1. First to eighth comparators 103a to 103h correspond to the first comparator 103 in FIG. 1.

The first adder 127a adds a first offset cancellation value βa to the input signal IN and outputs it. The second adder 101a adds a first equalization value αa to the output signal from the first adder 127a and outputs it. The first comparator 103a makes a binary decision on the output signal from the second adder 101a and outputs the value of the determination result. The output value of the first comparator 103a is an even-number-bit present determination value when the immediately preceding determination value is 0, and also the second determination value from the present bit is 0.

The third adder 127b adds a second offset cancellation value βb to the input signal IN and outputs it. The fourth adder 101b adds a second equalization value αb to the output signal from the third adder 127b and outputs it. The second comparator 103b makes a binary decision on the output signal from the fourth adder 101b and outputs the value of the determination result. The output value of the second comparator 103b is an even-number-bit present determination value when the immediately preceding determination value is 0, and the second determination value from the present bit is 1.

The fifth adder 127c adds a third offset cancellation value βc to the input signal IN and outputs it. The sixth adder 101c adds a third equalization value αc to the output signal from the fifth adder 127c and outputs it. The third comparator 103c makes a binary decision on the output signal from the sixth adder 101c and outputs the value of the determination result. The output value of the third comparator 103c is an even-number-bit present determination value when the immediately preceding determination value is 1, and the second determination value from the present bit is 0.

The seventh adder 127d adds a fourth offset cancellation value βd to the input signal IN and outputs it. The eighth adder 101d adds a fourth equalization value αd to the output signal from the seventh adder 127d and outputs it. The fourth comparator 103d makes a binary decision on the output signal from the eighth adder 101d and outputs the value of the determination result. The output value of the fourth comparator 103d is an even-number-bit present determination value when the immediately preceding determination value is 1, and also the second determination value from the present bit is 1.

The ninth adder 127e adds a fifth offset cancellation value βe to the input signal IN and outputs it. The tenth adder 101e adds a fifth equalization value αe to the output signal from the ninth adder 127e and outputs it. The fifth comparator 103e makes a binary decision on the output signal from the tenth adder 101e and outputs the value of the determination result. The output value of the fifth comparator 103e is an odd-number-bit present determination value when the immediately preceding determination value is 0, and also the second determination value from the present bit is 0.

The eleventh adder 127$f$ adds a sixth offset cancellation value $\beta f$ to the input signal IN and outputs it. The twelfth adder 101$f$ adds a sixth equalization value $\alpha f$ to the output signal from the eleventh adder 127$f$ and outputs it. The sixth comparator 103$f$ makes a binary decision on the output signal from the twelfth adder 101$f$ and outputs the value of the determination result. The output value of the sixth comparator 103$f$ is an odd-number-bit present determination value when the immediately preceding determination value is 0, and the second determination value from the present bit is 1.

The thirteenth adder 127$g$ adds a seventh offset cancellation value $\beta g$ to the input signal IN and outputs it. The fourteenth adder 101$g$ adds a seventh equalization value $\alpha g$ to the output signal from the thirteenth adder 127$g$ and outputs it. The seventh comparator 103$g$ makes a binary decision on the output signal from the fourteenth adder 101$g$ and outputs the value of the determination result. The output value of the seventh comparator 103$g$ is an odd-number-bit present determination value when the immediately preceding determination value is 1, and the second determination value from the present bit is 0.

The fifteenth adder 127$h$ adds an eighth offset cancellation value $\beta h$ to the input signal IN and outputs it. The sixteenth adder 101$h$ adds an eighth equalization value $\alpha h$ to the output signal from the fifteenth adder 127$h$ and outputs it. The eighth comparator 103$h$ makes a binary decision on the output signal from the sixteenth adder 101$h$ and outputs the value of the determination result. The output value from the eighth comparator 103$h$ is an odd-number-bit present determination value when the immediately preceding determination value is 1, and also the second determination value from the present bit is 1.

If the second determination value from the present bit at an even-number bit, latched by a D flip-flop 711, is 0, a selector 701 selects the output signal from the first comparator 103$a$ and outputs it, and if the second determination value from the present bit, latched by the D flip-flop 711, is 1, the selector 701 selects the output signal from the second comparator 103$b$ and outputs it.

If the second determination value from the present bit at an even-number bit, latched by the D flip-flop 711, is 0, a selector 702 selects the output signal from the third comparator 103$c$ and outputs it, and if the second determination value from the present bit, latched by the D flip-flop 711, is 1, the selector 702 selects the output signal from the fourth comparator 103$d$ and outputs it.

If the second determination value from the present bit at an odd-number bit, latched by a D flip-flop 712, is 0, a selector 703 selects the output signal from the fifth comparator 103$e$ and outputs it, and if the second determination value from the present bit, latched by the D flip-flop 712, is 1, the selector 703 selects the output signal from the sixth comparator 103$f$ and outputs it.

If the second determination value from the present bit at an odd-number bit, latched by the D flip-flop 712, is 0, a selector 704 selects the output signal from the seventh comparator 103$g$ and outputs it, and if the second determination value from the present bit, latched by the D flip-flop 712, is 1, the selector 704 selects the output signal from the eighth comparator 103$h$ and outputs it.

A D flip-flop 705 latches an even-number-bit output signal from the selector 701 in synchronization with a clock signal /CLK, holds the latched signal, and outputs it. A D flip-flop 706 latches an even-number-bit output signal from the selector 702 in synchronization with the clock signal /CLK, holds the latched signal, and outputs it.

A D flip-flop 707 latches an odd-number-bit output signal from the selector 703 in synchronization with the clock signal CLK, holds the latched signal, and outputs it. Here, the clock signal CLK is an inverted signal of the clock signal /CLK. A D flip-flop 708 latches an odd-number-bit output signal from the selector 704 in synchronization with the clock signal CLK, holds the latched signal, and outputs it.

If the immediately preceding determination value at an even-number bit, latched by the D flip-flop 712, is 0, a selector 709 selects the output signal from the D flip-flop 705, and if the immediately preceding determination value, latched by the D flip-flop 712, is 1, the selector 709 selects the output signal from the D flip-flop 706 and outputs an even-number-bit determination output signal OUTe. The D flip-flop 711 latches the even-number-bit determination output signal OUTe in synchronization with the clock signal CLK, holds the latched signal OUTe, and outputs it to the selectors 701, 702, and 710.

If the immediately preceding determination value at an odd-number bit, latched by the D flip-flop 711, is 0, the selector 710 selects the output signal from the D flip-flop 707, and if the immediately preceding determination value, latched by the D flip-flop 711, is 1, the selector 710 selects the output signal from the D flip-flop 708 and outputs an even-number-bit determination output signal OUTo. The D flip-flop 712 latches the odd-number-bit determination output signal OUTo in synchronization with the clock signal /CLK, holds the latched signal OUTo, and outputs it to the selectors 703, 704, and 709.

Figure 6:
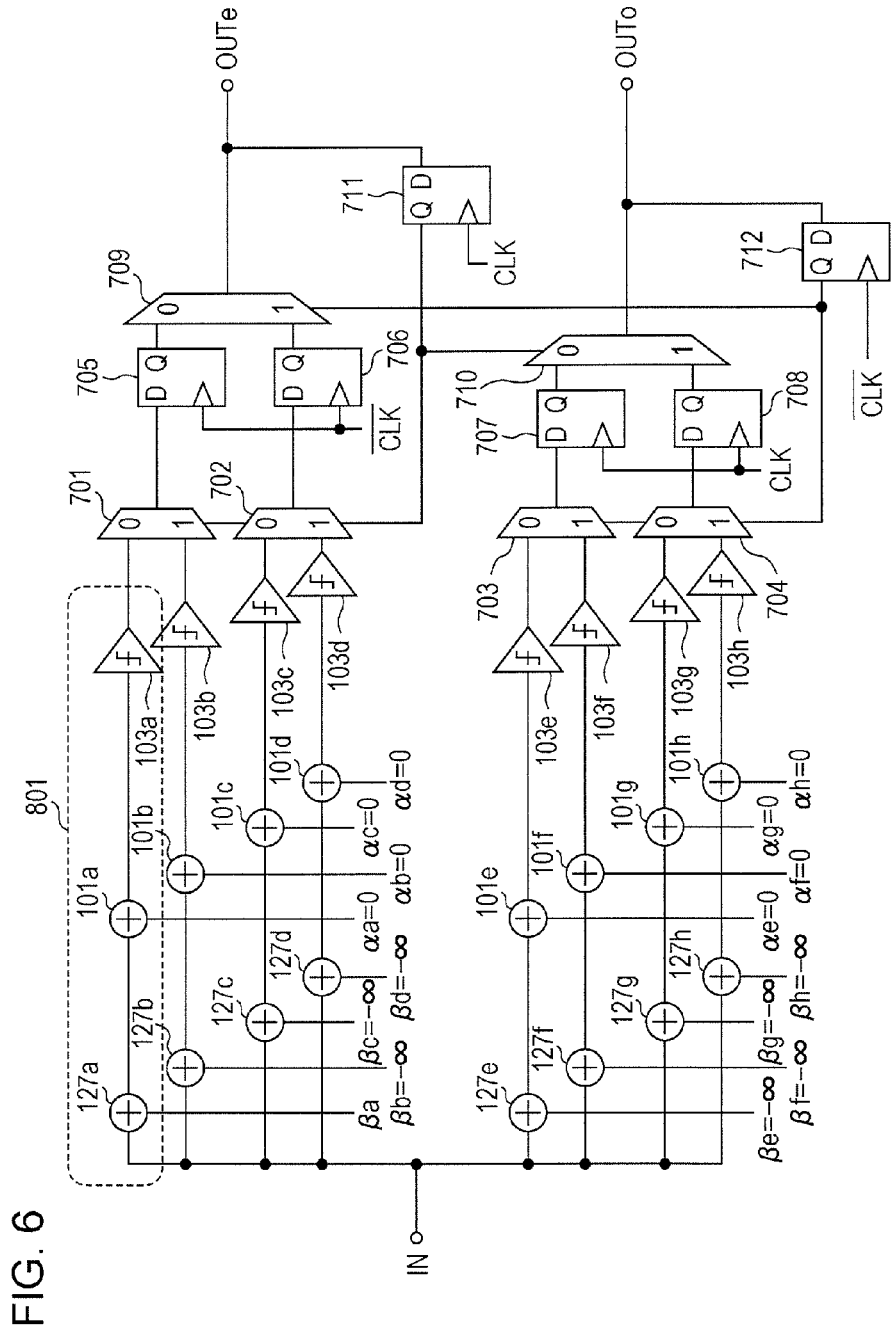
FIG. 6 is a diagram for explaining a method for setting a first offset cancellation value.

Since the receiving circuit of the another embodiment includes eight channels, the first to eighth offset cancellation values $\beta a$ to $\beta h$ are set in sequence. First, the first offset cancellation value $\beta a$ is set. FIG. 6 is a diagram for explaining a method for setting the first offset cancellation value $\beta a$. The first offset cancellation value $\beta a$ is a value for canceling the offset of a first channel 801 including the first and second adders 127$a$ and 101$a$ and the first comparator 103$a$. To set the first offset cancellation value $\beta a$, the input signal IN is set to 0 V, the eight equalization values $\alpha a$ to $\alpha h$ are set to 0, and the seven offset cancellation values $\beta b$ to $\beta h$ are set to the minimum value ($-\infty$), as in the embodiment. Setting the four offset cancellation values $\beta e$ to $\beta h$ to the minimum value ($-\infty$) can increase the probability of setting the immediately preceding determination value to "0". Setting the three offset cancellation values $\beta b$ to $\beta d$ to the minimum value ($-\infty$) can increase the probability of setting the second determination value from the present bit to "0". Since the first channel 801 is selected by the selectors 701 and 709 when the immediately preceding determination value is 0, and also the second determination value from the present bit is 0, the probability of selecting the first channel 801 can be increased. This allows the first offset cancellation value $\beta a$ to be set efficiently at high speed, as in the embodiment.

Figure 7:
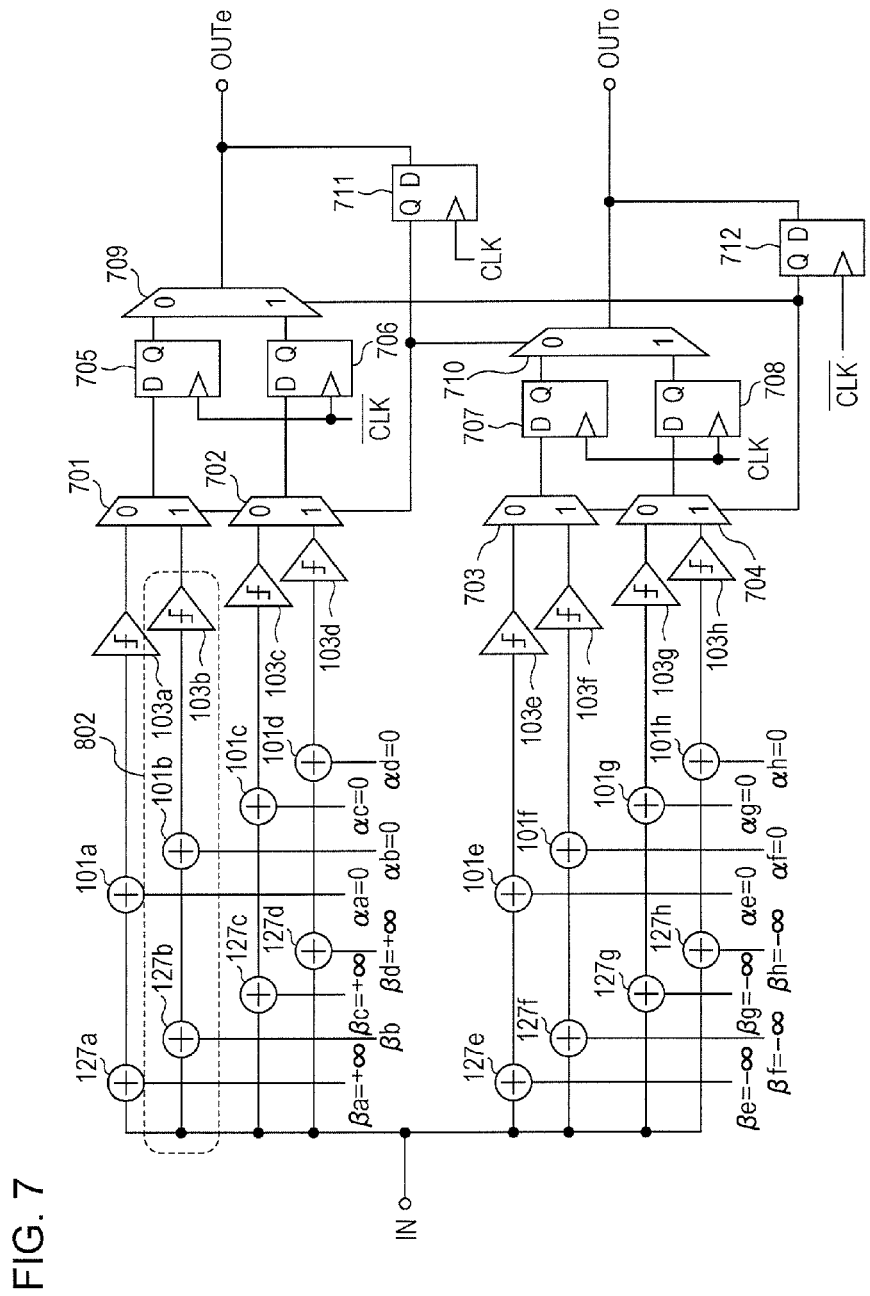
FIG. 7 is a diagram for explaining a method for setting a second offset cancellation value.

Next, the second offset cancellation value $\beta b$ is set. FIG. 7 is a diagram for explaining a method for setting the second offset cancellation value $\beta b$. The second offset cancellation value $\beta b$ is a value for canceling the offset of a second channel 802 including the third and fourth adders 127$b$ and 101$b$ and the second comparator 103$b$. To set the second offset cancellation value $\beta b$, the input signal IN is set to 0 V, the eight equalization values $\alpha a$ to $\alpha h$ are set to 0, the three offset cancellation values $\beta a$, $\beta c$, and $\beta d$ are set to the maximum value ($+\infty$), and the four offset cancellation values $\beta e$ to $\beta h$ are set to the minimum value ($-\infty$), as in the embodiment. Setting the four offset cancellation values $\beta e$ to $\beta h$ to the minimum value (−∞) can increase the probability of setting the immediately preceding determination value to "0". Setting the three offset cancellation values βa, βc, and βd to the maximum value (+∞) can increase the probability of setting the second determination value from the present bit to "1". Since the second channel 802 is selected by the selectors 701 and 709 when the immediately preceding determination value is 0, and the second determination value from the present bit is 1, the probability of selecting the second channel 802 can be increased. This allows the second offset cancellation value βb, to be set efficiently at high speed, as in the embodiment.

The offset cancellation values βc to βh are set in sequence as in the above. After the setting, the offset cancellation values βa to βh are fixed, and the receiving circuit operates in the normal mode, as in the embodiment.

The selectors 701 to 704, 709, and 710 selectively output the determination results of the first to eighth comparators 103a to 103h in accordance with the determination result on the preceding two bits of the input signal IN. The offset cancellation circuit controls the first to eighth offset cancellation values βa to βh in accordance with the determination result of the preceding two bits of the input signal IN. This allows the receiving circuit to output the even-number-bit determination output signal OUTe and the odd-number-bit determination output signal OUTo by interleave processing.

Figure 8:
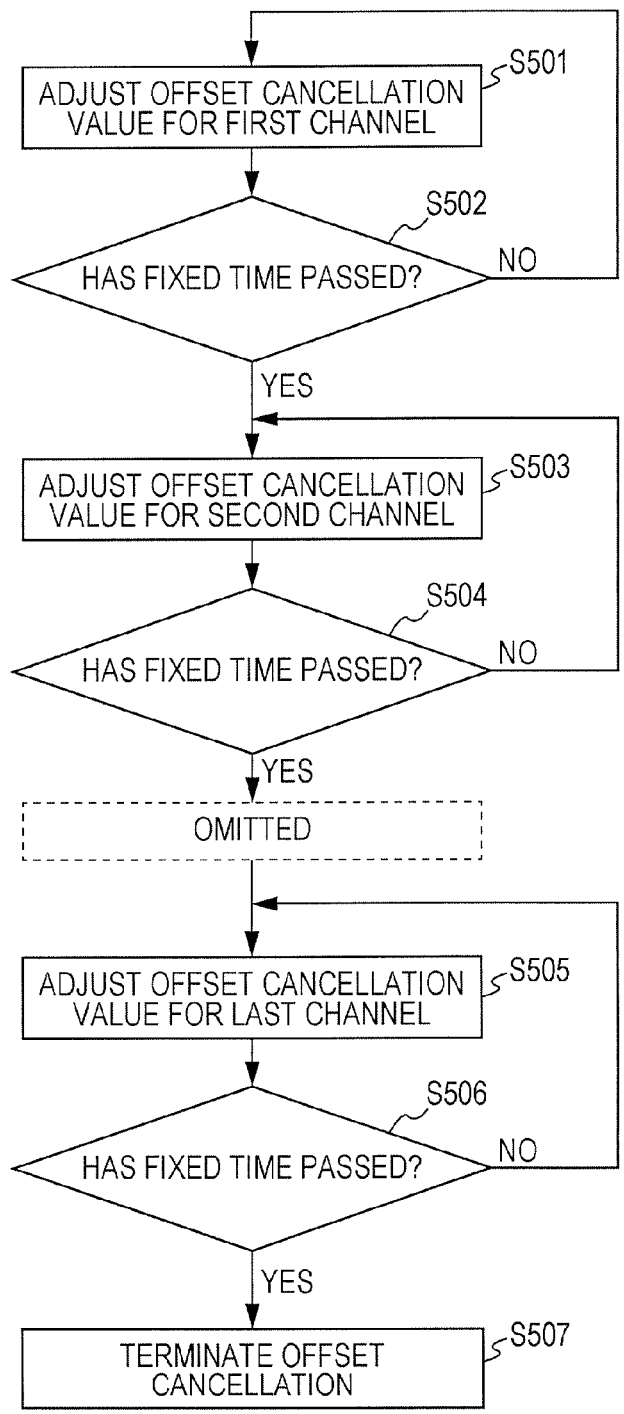
FIG. 8 is a flowchart for the process of a receiving circuit according to another embodiment.
Figure 9:
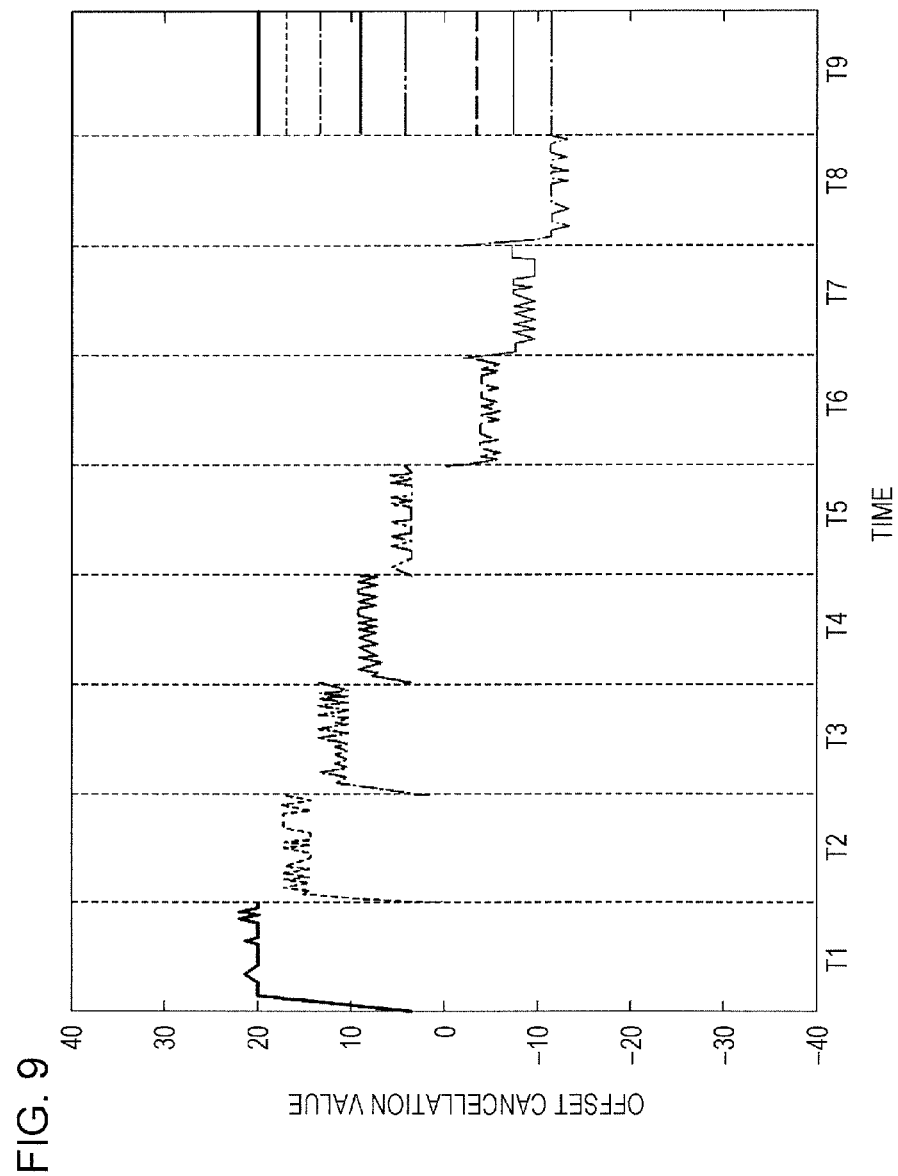
FIG. 9 is a diagram illustrating changes in an offset cancellation value with time.

FIG. 8 is a flowchart for the process of a receiving circuit according to an embodiment. FIG. 9 is a diagram illustrating changes in an offset cancellation value with time. Although the embodiment described on FIG. 8 is of the case where the receiving circuit includes the two channels 301 and 302, and the another embodiment is of the case where the receiving circuit includes eight channels, the number of channels may be other than two and eight. FIG. 9 illustrates an example in which the number of channels is eight. First, to perform a process in the offset-cancellation setting mode, the receiving circuit sets the input signal IN to 0 V and sets all the equalization values α to 0.

In step S501, the receiving circuit adjusts an offset cancellation value for the first channel during time T1. Next, in step S502, the receiving circuit determines whether a fixed time has passed. If the fixed time has not passed, the process returns to step S501, and if the fixed time has passed, the process goes to step S503. During time T1, the initial value of the offset cancellation value for the first channel is 0, which converges to a correct value after a lapse of the fixed time.

In step S503, the receiving circuit adjusts an offset cancellation value for the second channel during time T2. Next, in step S504, the receiving circuit determines whether a fixed time has passed. If the fixed time has not passed, the process returns to step S503, and if the fixed time has passed, the process goes to the next step. During time T2, the initial value of the offset cancellation value for the second channel is 0, which converges to a correct value after a lapse of a fixed time.

Next, during time T3, the receiving circuit adjusts an offset cancellation value for the third channel. During time T3, the initial value of the offset cancellation value for the third channel is 0, which converges to a correct value after a lapse of a fixed time.

Next, during time T4, the receiving circuit adjusts an offset cancellation value for the fourth channel. During time T4, the initial value of the offset cancellation value for the fourth channel is 0, which converges to a correct value after a lapse of a fixed time.

Next, during time T5, the receiving circuit adjusts an offset cancellation value for the fifth channel. During time T5, the initial value of the offset cancellation value for the fifth channel is 0, which converges to a correct value after a lapse of a fixed time.

Next, during time T6, the receiving circuit adjusts an offset cancellation value for the sixth channel. During time T6, the initial value of the offset cancellation value for the sixth channel is 0, which converges to a correct value after a lapse of a fixed time.

Next, during time T7, the receiving circuit adjusts an offset cancellation value for the seventh channel. During time T7, the initial value of the offset cancellation value for the seventh channel is 0, which converges to a correct value after a lapse of a fixed time.

In step S505, during time T8, the receiving circuit adjusts an offset cancellation value for the last channel. Next, in step S506, the receiving circuit determined whether a fixed time has passed. If the fixed time has not passed, the process returns to step S505, and if the fixed time has passed, the process goes to step S507. During time T8, the initial value of the offset cancellation value for the last channel is 0, which converges to a correct value after a lapse of a fixed time.

In step S507, during time T9, the receiving circuit fixes the adjusted offset cancellation values for the first to last channels. The offset cancellation values may be fixed, for example, by storing the offset cancellation values in a register. Thereafter, the receiving circuit operates in the normal mode.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A receiving circuit, comprising:
 a first adder configured to add a first offset cancellation value to an input signal value;
 a second adder configured to add a first equalization value to an output signal value from the first adder;
 a first comparator configured to make a binary decision on an output signal value from the second adder;
 a third adder configured to add a second offset cancellation value to the input signal value;
 a fourth adder configured to add a second equalization value to an output signal value from the third adder;
 a second comparator configured to make a binary decision on an output signal value from the fourth adder;
 a selector configured to output a determination result of the first comparator or a determination result of the second comparator in accordance with a determination result of preceding one bit of the input signal value;
 a demultiplexer configured to convert an output signal from the selector from serial to parallel; and
 an offset cancellation circuit connected to a subsequent stage of the demultiplexer and configured to control the first offset cancellation value and the second offset cancellation value in accordance with the determination result of the preceding one bit of the input signal value.

2. The receiving circuit according to claim 1, wherein, in an offset-cancellation setting mode, a signal value corresponding to a threshold value for the binary decision is input as the input signal value, and the first equalization value and the second equalization value are set to 0.

3. The receiving circuit according to claim 1, wherein when the determination result of the preceding one bit of the input signal value is 0, the selector outputs a determination result of the first comparator, and when the determination result of the preceding one bit of the input signal value is 1, the selector outputs a determination result of the second comparator.

4. The receiving circuit according to claim 3, wherein
when the determination result on the preceding one bit of the input signal value is 0, the offset cancellation circuit controls the first offset cancellation value in accordance with a determination result on the input signal value at the present; and
when the determination result on the preceding one bit of input signal value is 1, the offset cancellation circuit controls the second offset cancellation value in accordance with the determination result of the input signal value at the present.

5. The receiving circuit according to claim 3, wherein
when setting the first offset cancellation value, the offset cancellation circuit sets the second offset cancellation value as a second fixed value, and when the determination result of the preceding one bit of the input signal value is 0, the offset cancellation circuit controls the first offset cancellation value in accordance with the determination result of the input signal value at the present; and
when setting the second offset cancellation value, the offset cancellation circuit sets the first offset cancellation value as a first fixed value, and when the determination result of the preceding one bit of the input signal value is 1, the offset cancellation circuit controls the second offset cancellation value in accordance with the determination result of the input signal value at the present.

6. The receiving circuit according to claim 1, wherein when the preceding output value of the selector is 0, the selector outputs the determination result of the first comparator, and when the preceding output value of the selector is 1, the selector outputs the determination result of the second comparator.

7. The receiving circuit according to claim 1, further comprising:
a fifth adder configured to add a third offset cancellation value to the input signal value;
a sixth adder configured to add a third equalization value to an output signal value from the fifth adder;
a third comparator configured to make a binary decision on an output signal value from the sixth adder;
a seventh adder configured to add a fourth offset cancellation value to the input signal value;
an eighth adder configured to add a fourth equalization value to an output signal value from the seventh adder;
a fourth comparator configured to make a binary decision on an output signal value from the eighth adder;
a ninth adder configured to add a fifth offset cancellation value to the input signal value;
a tenth adder configured to add a fifth equalization value to an output signal value from the ninth adder;
a fifth comparator configured to make a binary decision on an output signal value from the tenth adder;
an eleventh adder configured to add a sixth offset cancellation value to the input signal value;
a twelfth adder configured to add a sixth equalization value to an output signal value from the eleventh adder;
a sixth comparator configured to make a binary decision on an output signal value from the twelfth adder;
a thirteenth adder configured to add a seventh offset cancellation value to the input signal value;
a fourteenth adder configured to add a seventh equalization value to an output signal value from the thirteenth adder;
a seventh comparator configured to make a binary decision on an output signal value from the fourteenth adder;
a fifteenth adder configured to add an eighth offset cancellation value to the input signal value;
a sixteenth adder configured to add an eighth equalization value to an output signal value from the fifteenth adder; and
an eighth comparator configured to make a binary decision on an output signal value from the sixteenth adder,
wherein the selector selectively outputs determination results of the first to eighth comparators in accordance with determination results of preceding two bits of the input signal values; and
the offset cancellation circuit controls the first to eighth offset cancellation values in accordance with the determination results of the preceding two bits of the input signal values.

* * * * *